US012201572B2

(12) United States Patent
Yan

(10) Patent No.: US 12,201,572 B2
(45) Date of Patent: *Jan. 21, 2025

(54) MASSAGE DEVICE

(71) Applicant: Bo Yan, Guangdong (CN)

(72) Inventor: Bo Yan, Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/635,094

(22) Filed: Apr. 15, 2024

(65) Prior Publication Data

US 2024/0299238 A1 Sep. 12, 2024

Related U.S. Application Data

(63) Continuation of application No. 18/372,701, filed on Sep. 26, 2023, now Pat. No. 11,957,634, which is a (Continued)

(51) Int. Cl.
*A61H 19/00* (2006.01)
*A61H 23/02* (2006.01)

(52) U.S. Cl.
CPC ............ *A61H 19/30* (2013.01); *A61H 19/44* (2013.01); *A61H 23/0254* (2013.01); (Continued)

(58) Field of Classification Search
CPC ........ A61H 19/00; A61H 19/30; A61H 19/32; A61H 19/34; A61H 19/40; A61H 19/44; (Continued)

(56) References Cited

U.S. PATENT DOCUMENTS 2,263,219 A * 11/1941 Lybarger ................ A61H 21/00 219/229
5,657,765 A * 8/1997 Est ......................... A61H 19/50 128/842

(Continued)

FOREIGN PATENT DOCUMENTS

CN 102429805 A 5/2012
CN 103393530 A 11/2013

(Continued)

OTHER PUBLICATIONS

Definition of the term “through”, MerriamWebster.com.*

(Continued)

*Primary Examiner* — Tu A Vo
(74) *Attorney, Agent, or Firm* — Andrew C. Cheng

(57) ABSTRACT

A massage device includes a shell configured to be inserted into a vagina, a lateral wall of the shell concaved inwardly and laterally relative to an outer lateral surface of the shell to define a moving space which communicates with an outside environment out of the outer lateral surface of the shell; a driving member arranged in a chamber of the shell, wherein the chamber is adjacent to and not communicating with the moving space; and a massage member connected to the driving member in a transmission way. The massage member is swingable in a lateral direction of the shell, wherein when the massage member swings, a portion of the massage member is reciprocating to at least a first position inside the moving space of the shell and at least a second position in the outside environment out of the outer lateral surface of the shell.

13 Claims, 15 Drawing Sheets

Related U.S. Application Data continuation of application No. 18/118,749, filed on Mar. 8, 2023, now Pat. No. 11,771,619.

(52) U.S. Cl.
CPC ................ *A61H 2201/1215* (2013.01); *A61H 2201/149* (2013.01); *A61H 2201/1676* (2013.01)

(58) Field of Classification Search
CPC ........ A61H 19/50; A61H 21/00; A61H 7/002; A61H 7/004; A61H 7/005; A61H 23/0263
See application file for complete search history.

(56) References Cited

U.S. PATENT DOCUMENTS

| | | | | | |
|---|---|---|---|---|---|
| 5,843,006 | A * | 12/1998 | Phillips | A61H 7/005 601/134 |
| 6,190,339 | B1 * | 2/2001 | Imazaike | A61H 7/005 601/135 |
| 6,422,993 | B1 * | 7/2002 | Hudson | A61H 19/34 600/38 |
| 9,119,765 | B2 * | 9/2015 | Topolev | A61H 19/44 |
| 11,369,545 | B1 * | 6/2022 | He | A61H 7/001 |
| 11,491,078 | B1 * | 11/2022 | He | A61H 7/005 |
| 11,633,327 | B1 * | 4/2023 | Wu | A61H 23/0263 601/70 |
| 2007/0129599 | A1 * | 6/2007 | Nan | A61H 23/0263 600/38 |
| 2009/0306561 | A1 * | 12/2009 | Naganuma | A61H 39/04 601/137 |
| 2010/0160840 | A1 * | 6/2010 | Murphy | A61H 7/005 601/112 |
| 2014/0309565 | A1 * | 10/2014 | Allen | A61H 19/44 601/46 |
| 2015/0148592 | A1 * | 5/2015 | Kanbar | A61H 19/34 600/38 |
| 2015/0272814 | A1 * | 10/2015 | Chen | A61H 15/0085 601/97 |
| 2016/0051438 | A1 * | 2/2016 | Hahr | A61H 23/0263 601/72 |
| 2016/0184178 | A1 * | 6/2016 | Hahr | A61H 23/02 600/38 |
| 2020/0085681 | A1 | 3/2020 | Haddock et al. | |
| 2022/0160577 | A1 * | 5/2022 | Cai | A61H 9/0057 |
| 2023/0355463 | A1 * | 11/2023 | Cirillo-Schmidt | A61H 23/0263 |
| 2024/0108538 | A1 * | 4/2024 | Chen | A61H 23/0254 |

FOREIGN PATENT DOCUMENTS

| | | | | |
|---|---|---|---|---|
| CN | 204890546 | U | | 12/2015 |
| CN | 111419660 | A | | 7/2020 |
| CN | 211095924 | U | | 7/2020 |
| CN | 114344122 | A | | 4/2022 |
| CN | 217409236 | U | | 9/2022 |
| EA | 015002671-0001 | S | | 11/2022 |
| EP | 3925588 | A1 | | 12/2021 |
| EP | 4406526 | A1 | | 7/2024 |
| IT | AR20100010 | A1 | | 10/2011 |
| JP | 2006110289 | A | | 4/2006 |
| JP | 2007296299 | A | | 11/2007 |
| KR | 20220096692 | A | * | 7/2022 |
| WO | 2015096179 | | | 7/2015 |

OTHER PUBLICATIONS

Definition of the term "limit", Oxfordlearnersdictionary.com.*
Extended European Search Report Dated May 7, 2024 for corresponding European Application No. 23211161.7.
Notice of Refusal Dated Jul. 9, 2024 for Corresponding Japanese Patent Application No. 2023-200162.
Notice of Public Submission of counterpart Japanese Patent Application No. 2023-200162 Issued on Aug. 20, 2024.
Supplementary document for procedures of counterpart Japanese Patent Application No. 2023-200162 Issued on Aug. 15, 2024.
Office Action Dated Sep. 10, 2024 in Ex Parte Reexamination of U.S. Appl. No. 90/019,477 Associated with Patent No. 11,771,619.
Response to the Office Action in Ex Parte Reexamination of U.S. Appl. No. 90/019,477 Associated with Patent No. 11,771,619.
Declaration/Affidavit under 37 C.F.R. § 1.130 as Flied along with the Response to Office Action in Ex Parte Reexamination of U.S. Appl. No. 90/019,477 Associated with Patent No. 11,771,619.
Purchase and Sale Contract (Exhibit A) as Filed along with the Response to Office Action in Ex Parte Reexamination of U.S. Appl. No. 90/019,477 Associated with Patent No. 11,771,619.
Purchase Declaration (Exhibit B) as Filed along with the Response to Office Action in Ex Parte Reexamination of U.S. Appl. No. 90/019,477 Associated with Patent No. 11,771,619.
Screenshot of Product Sales Interface on AliExpress (Exhibit C) as Flied along with the Response to Office Action in Ex Parte Reexamination of U.S. Appl. No. 90/019,477 Associated with Patent No. 11,771,619.
Screenshot of Product Sales Interface on AliExpress (Exhibit D) as Flied along with the Response to Office Action in Ex Parte Reexamination of U.S. Appl. No. 90/019,477 Associated with Patent No. 11,771,619.
Purchase Orders (Exhibit E) as Filed along with the Response to Office Action in Ex Parte Reexamination of U.S. Appl. No. 90/019,477 Associated with Patent No. 11,771,619.
AliExpress User Manual (Exhibit F) as Filed along with the Response to Office Action in Ex Parte Reexamination of U.S. Appl. No. 90/019,477 Associated with Patent No. 11,771,619.
Reexam Certificate of Service as Filed along with the Response to Office Action in Ex Parte Reexamination of U.S. Appl. No. 90/019,477 Associated with Patent No. 11,771,619.
Examiner Interview Summary Record of U.S. Appl. No. 90/019,477 Associated with Patent No. 11,771,619.
Notice of Public Submission of Counterpart European Patent Application No. 23211161.7 Issued on Sep. 19, 2024.
Notice of Refusal Dated Oct. 29, 2024 for Corresponding Japanese Patent Application No. 2023-200162.

* cited by examiner

MASSAGE DEVICE

CROSS-REFERENCE TO RELATED APPLICATIONS

This application is a continuation application of application Ser. No. 18/372,701, filed on Sep. 26, 2023, which is a continuation application of application Ser. No. 18/118,749, filed on Mar. 8, 2023 and now patented as U.S. Pat. No. 11,771,619 on Oct. 3, 2023, which claims priority to Chinese Patent Application No. 202310081620.1, filed on Jan. 17, 2023, and Chinese Patent Application No. 202310193022.3, filed on Feb. 28, 2023. The content of the aforementioned application, including any intervening amendments thereto, are incorporated herein by reference.

TECHNICAL FIELD

The present invention relates to the technical field of massage devices, and in particular to a massage device with a swinging massage member.

BACKGROUND

With the development of society and economy, the pace of life is getting faster and faster, and the pressure of work is getting higher and higher. Thus, the demand for physical relaxation is increasing, and consumer-grade massage device is becoming popular.

The massage device in the related art generally includes motor and a massage head driven by the motor. During operation, the massage head does linear reciprocating motion to hit a part of the human body that needs to be massaged, such as the waist, the neck and the like. Such massage device is relatively simple in actions, and the massage head thereof is subject to the resistance of the massaged part of the human body during operation, so it is difficult to play good massage effect and accordingly the massage experience is not ideal.

SUMMARY

An object of the present invention is to provide a massage device that is capable of playing good massage effect even under the resistance of the massaged part, thereby improving the massage experience.

In order to achieve the above object, a technical solution of the present invention provides a massage device, including:

- a shell configured to be inserted into a vagina along an insertion direction, a lateral wall of the shell concaved inwardly and laterally relative to an outer lateral surface of the shell to define a moving space, the moving space communicating with an outside environment out of the outer lateral surface of the shell, wherein the lateral wall extends along the insertion direction of the shell;
- a driving member arranged in a chamber of the shell, wherein the chamber is adjacent to and not communicating with the moving space; and
- a massage member connected to the driving member in a transmission way, the massage member being swingable in a lateral direction of the shell under the driving of the driving member, wherein when the massage member swings, a portion of the massage member is reciprocating to at least a first position inside the moving space of the shell and at least a second position in the outside environment out of the outer lateral surface of the shell.

Compared with the prior art, the massage device according to the embodiment of this invention defines the moving space in the shell for providing sufficient space for the swinging of the massage member, so that the massage device is capable of generating strong force to the massaged part even under the resistance of the massaged part, thereby playing good massage effect.

BRIEF DESCRIPTION OF THE DRAWINGS

In order to illustrate the technical solution in embodiments of the present invention more clearly, the following briefly introduces accompanying drawings used in the description of the embodiments. Obviously, the accompanying drawings in the following description are only some embodiments of the present invention. Those of ordinary skill in the art can obtain other accompanying drawings from these accompanying drawings without any creative efforts.

DESCRIPTION OF THE EMBODIMENTS

Figure 1:
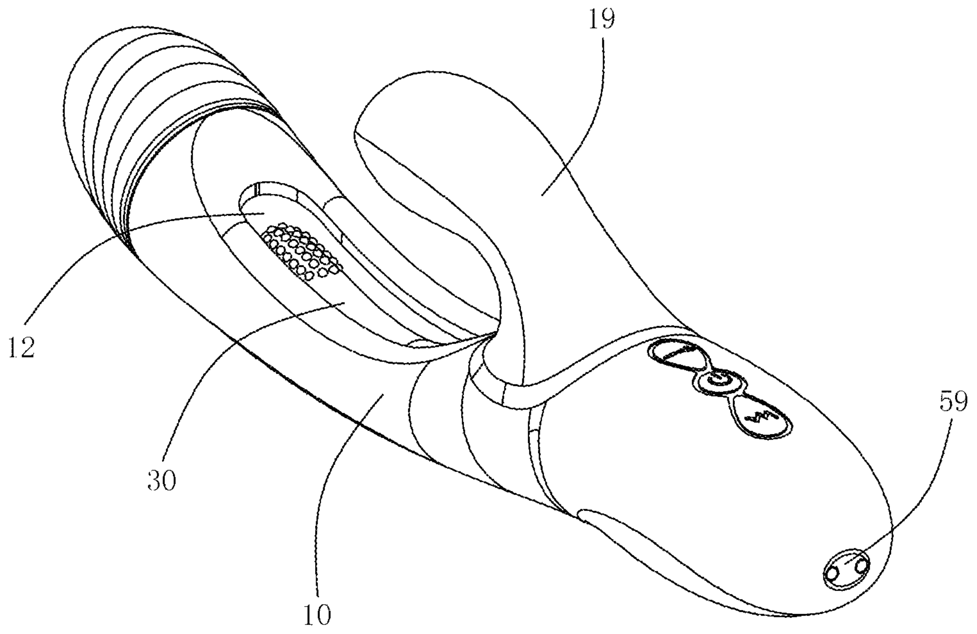
FIG. 1 is an isometric, assembled view of a massage device according to an embodiment of the present invention.

In order to make those skilled in the art better understand the technical solution of the present invention, the technical solution in the embodiments of the present invention will be clearly and completely described below with reference to accompanying drawings in the embodiments of the present invention. Obviously, the described embodiments are only a part of the embodiments of the present invention, but not all of the embodiments. Based on the embodiments of the present invention, all other embodiments obtained by those skilled in the art without any creative efforts fall within the protection scope of the present invention.

It should be noted that when an element is said to be "connected" to another element, it may be directly connected to another element, or indirectly connected to another element through one or multiple intermediate elements.

In the specification, the oriental or positional relationships indicated by the terms "longitudinal", "transverse", "top", "bottom", "inner", "outer", "central", "axial", "radial", "circumferential" and the like are only intended to facilitate the description of the present invention and simplify the description based on oriental or positional relationships shown in the accompanying drawings, not to indicate or imply that the apparatus or element referred must have a specific orientation, is constructed and operated in a specific orientation, and therefore cannot be understood as a limitation of the present invention.

Unless otherwise specified and limited, the specific meanings of all technical and scientific terms used in the specification can be specifically understood by persons of ordinary skill in the art. The terms used in the specification of this application is for the purpose of describing specific embodiments only and is not intended to limit this application.

Referring to FIG. 1 to FIG. 4, a massage device according an embodiment of the present invention is provided. The massage device includes a shell 10, a driving member 20 mounted in the shell 10 and a massage member 30 connected to the driving member 20 in a transmission way. The shell 10 defines a moving space 12 therein. The moving space 12 communicates with the outside environment. The massage member 30 extends into the moving space 12, and moves relative to the shell 10 under the action of the driving member 20. During moving of the massage member 30, at least a portion of the massage member 30 is capable of extending beyond the moving space 12 of the shell 10 to the outside environment, so as to massage a corresponding part of the human body out of the shell 10.

The massage device according to the embodiment of this invention defines the moving space 12 in the shell 10, the massage member 30 extends into the moving space 12, and the driving member 20 makes the massage member 30 move relative to the shell 10 in the form of swinging, so that at least a portion of the massage member 30, particularly a free end of the massage member 30 swings beyond the moving space 12 of the shell 10 to hit the corresponding part of the human body out of the shell 10, thereby performing massage to the human body. The design of the moving space 12 in the shell 10 provides sufficient space for the swinging of the massage member 30, and thus the massage device is capable of generating strong force to the massaged part even under the resistance of the massaged part, thereby playing good massage effect.

Preferably, the massage member 30 is an elastic structure and is capable of generating deformation when it hits the massaged part, so that the shape of the massage member 30 after deformed matches with the shape of the massaged part. In this way, a contact area of the massage member 30 and the massaged part is enlarged, and thus the massage effect is further improved.

In some embodiments, the entire massage member 30 may be made of soft materials, such as silica, rubber and the like.

In some embodiments, an outer portion of the massage member 30 for touching the massaged part is made of soft materials, and an inner portion of the massage member 30 embedded in the outer portion is made of hard materials, such as plastic, metal and etc.

Figure 4:
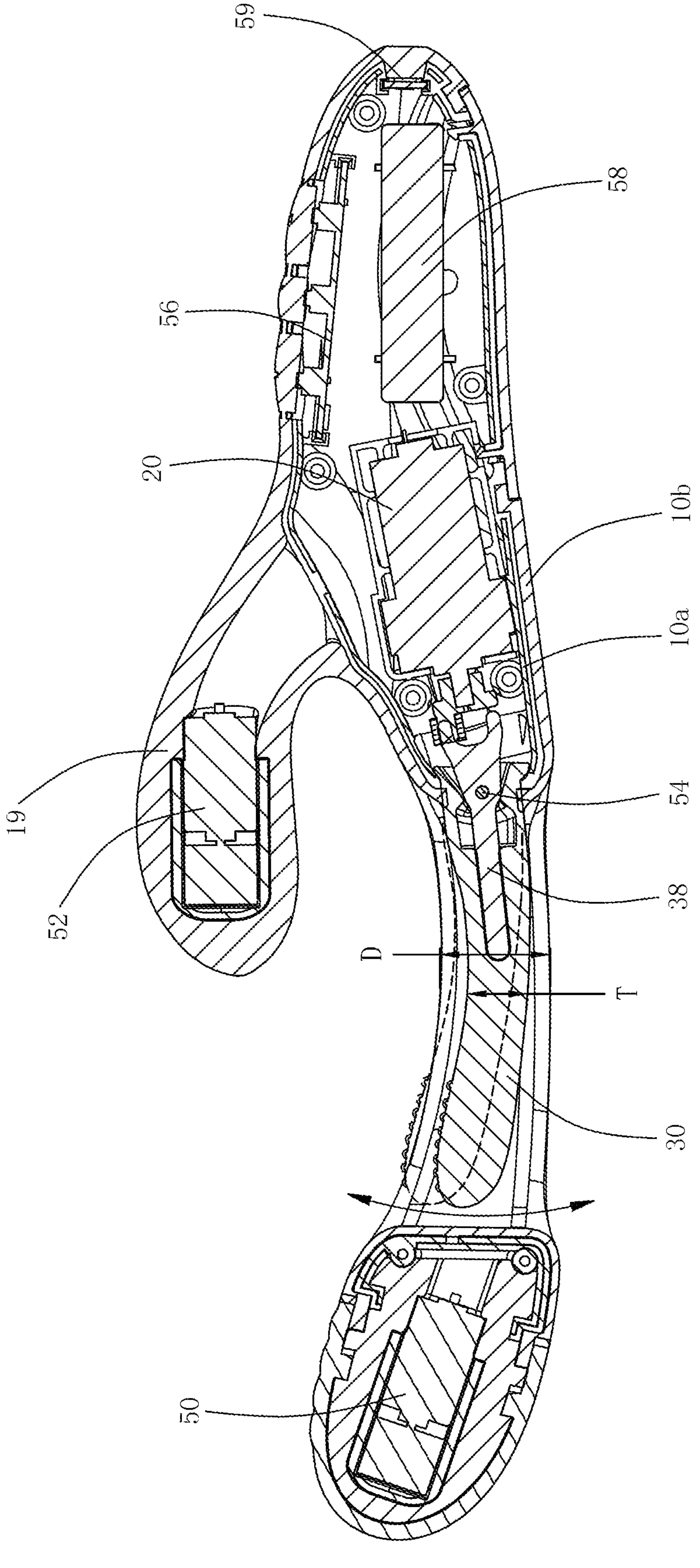
FIG. 4 is a cross sectional view of the massage device taken along ling IV-IV of FIG. 3.

As shown in FIG. 4, the massage member 30 swings in the moving space 12 along the depth direction, i.e., along the longitudinal direction to up and down in the moving space 12. Preferably, the thickness T of the massage member 30 along the longitudinal direction is less than the depth D of the moving space 12/the thickness of the shell 10 along the longitudinal direction, and the massage member 30 is completely received in the moving space 12 when it is not work. The thickness difference of the massage member 30 and the shell 10 provides a space therebetween along the swinging direction of the massage member 30, thus the massage member 30 is capable of swinging even the massaged part is nestled to the outer surface of the shell 10, thereby ensuring the massage experience.

In this embodiment, the massage member 30 is generally elongated and column-shaped. The thickness T of the massage member 30 is preferably 1 mm~150 mm, the width of the massage member 30 is preferably 1 mm~150 mm, and the length of the massage member 30 is preferably 5~150 mm, so as to make the touching area of the massage member 30 appropriate when it hit the massaged part. One end of the massage member 30 is connected to the driving member 20, and the other end of the massage member 30 is free. The free end of the massage member 30 acts as a massage head 32, swinging out of the moving space 12 to hit the massaged part. The entire massage member 30 is constructed as a single pendulum, and the massage head 32 may obtain a big swing amplitude even the swing angle of the massage member 30 is small.

Preferably, a plurality of bulges 34 are formed on the outer surface of the massage head 32 of the massage member 30 for improving stimulation to the massaged part. Alternately, the bulges 34 may be formed on the entire outer surface of the massage member 30. Preferably, the bulges 34 are integrally formed with the massage member 30, for example by injection molding. Alternately, the bulges 34 may be formed separately and then assembled to the massage member 30 by bonding.

Figure 3:
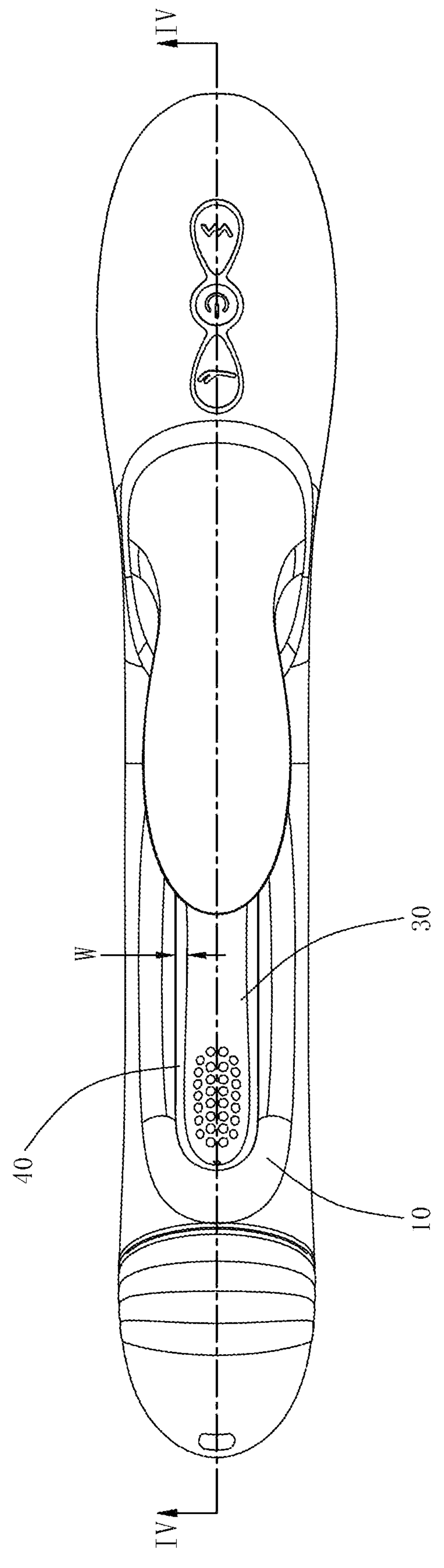
FIG. 3 is a top plane view of the massage device of FIG. 1.

As shown in FIG. 3, the massage member 30 is less than the moving space 12 of the shell 10 in lateral dimensions, and a gap 40 is defined between an outer surface of the massage member 30 and an inner surface of the shell 10 surrounding the moving space 12. The gap 40 makes the swinging of the massage member 30 in the moving space 12 not interfere with the shell 10. On the one side, the width W of the gap 40 is designed to be not less than 0.5 mm to ensure that the massage member 30 swings freely in the moving space 12, and on the other hand, the width W of the gap 40 is designed to be less than 100 mm to avoid wasting space and reduce the entire dimensions of the massage device. In specific embodiments, the width W of the gap 40 may be 0.5 mm, 1.5 mm, 3 mm, . . . , 50 mm, . . . , 99 mm or 100 mm.

In this embodiment, the moving space 12 has a shape similar to that of the massage member 30. The width W of the gap 40 between the outer surface of the massage member 30 and the inner surface of the shell 10 is substantially constant along a circumferential direction. Specifically, the moving space 12 is generally race-track shaped. The inner surface of the shell 10 is continuous along the circumferential direction, and the moving space 12 is closed circumferentially.

In this embodiment, the moving space 12 is a through hole extending through two opposite sides (top and bottom sides as viewed from FIG. 2) of the shell 10. In this case, the depth D of the moving space 12 is the same as the thickness of the shell 10, preferably ranges from 1 mm to 100 mm. During operation, the massage member 30 swings along the depth direction of the moving space 12, which can not only swing upwardly to the outside of the shell 10, but also swing downwardly to the outside of the shell 10. That is, the massage member 30 is capably of massaging two different parts of the human body which are located at two opposite sides of the shell 10 at the same time, which is more suitable for use in the human body to massage the cavity, such as the vagina.

Figure 7:
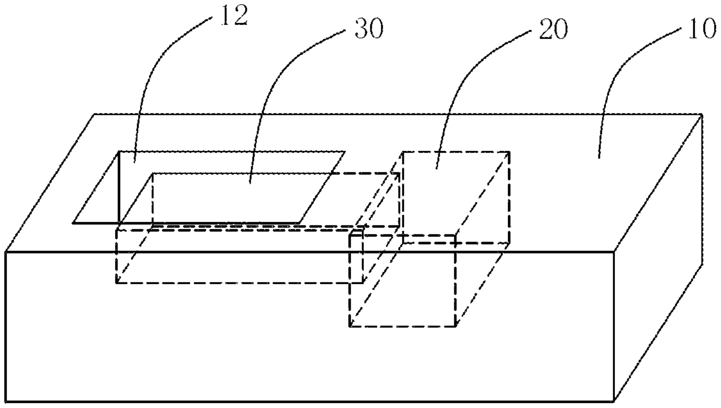
FIG. 7 is a schematic view of the massage device according to an alternative embodiment of the present invention.

In other embodiments, the moving space 12 may be a blind hole extending through only one side, such as the top side of the shell 10, as shown in FIG. 7. In this situation, the depth D of the moving space 12 is less than the thickness of the shell 10. The massage device with the blind hole is more suitable for massaging the body surface, such as the waist, the neck and the like. It should be noted that the massage device with the blind hole may also be used for massaging the cavity of the human body, and the massage device with the through hole may also be used for massaging the body surface.

In other embodiments, as shown in FIG. 5*a* to FIG. 6*d*, the moving space 12 may have a shape different from that of the massage member 30, and thus the width W of the gap 40 may be variable along the circumferential direction.

Figure 5A:
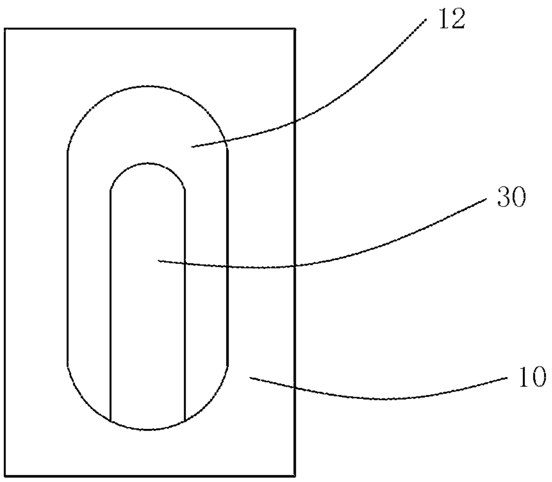
FIG. 5*a* is a schematic view of a moving space of the massage device.
Figure 5B:
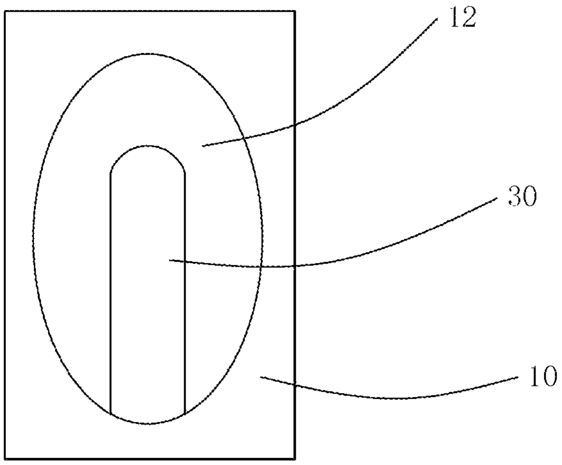
FIG. 5*b* shows a second embodiment of the moving space.
Figure 5C:
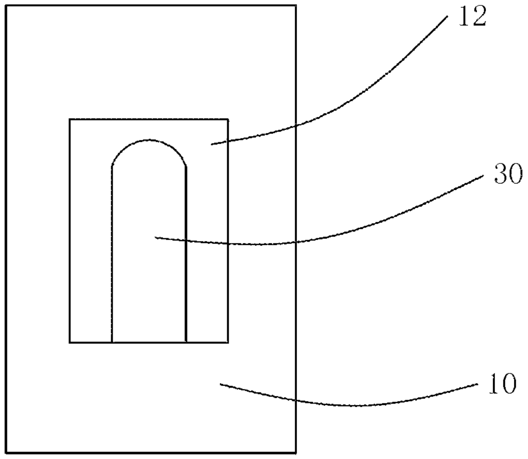
FIG. 5*c* shows a third embodiment of the moving space.
Figure 5D:
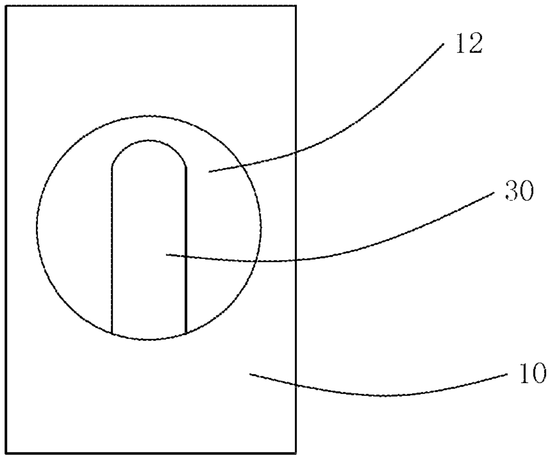
FIG. 5*d* shows a fourth embodiment of the moving space.
Figure 5E:
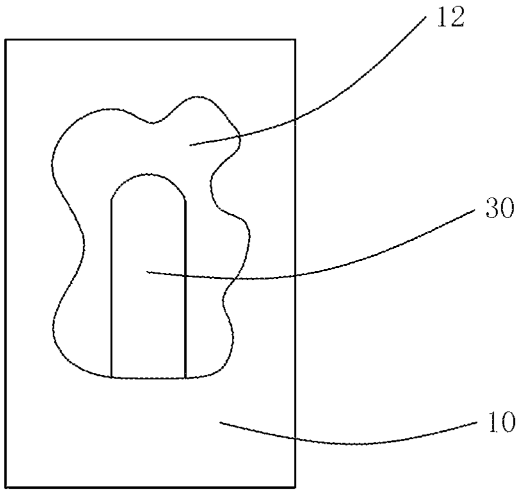
FIG. 5*e* shows a fifth embodiment of the moving space.
Figure 5F:
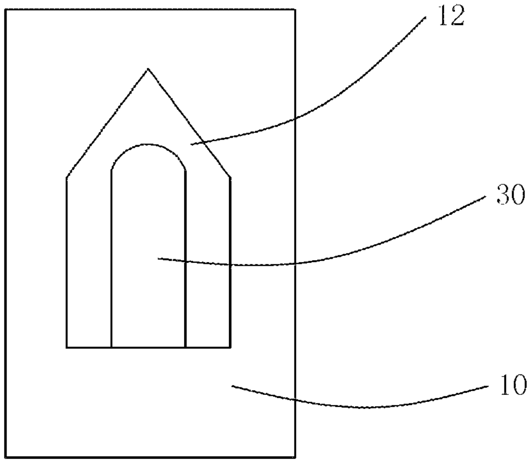
FIG. 5*f* shows a sixth embodiment of the moving space.

The shape of the moving space 12 may be regular or irregular, specifically may be any one of circle, semicircle, ellipse, square, rectangle, triangle, polygon, D-shape, C-shaped, kidney-shaped, heart-shaped, gourd-shaped, briolette, and etc., or may be a combination of at least two of them. For example, the moving space 12 shown in FIG. 5*a* is generally kidney-shaped, the moving space 12 shown in FIG. 5*b* is generally elliptical, the moving space 12 shown in FIG. 5*c* is generally rectangular, the moving space 12 shown in FIG. 5*d* is generally circular, the moving space 12 shown in FIG. 5*e* is generally irregular, the moving space 12 shown in FIG. 5*f* is generally a combination of a triangle and a rectangle. It should be understood that the shape of the moving space 12 may be set according to needs, which is not limited to the embodiments.

Figure 5G:
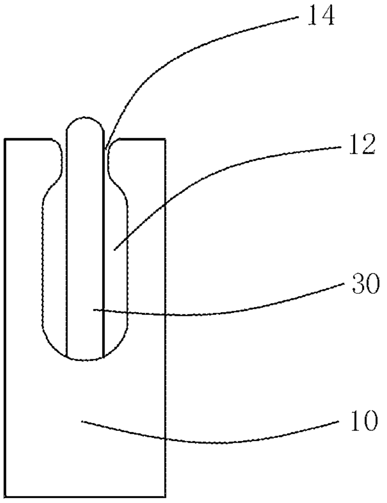
FIG. 5*g* shows a seventh embodiment of the moving space.
Figure 5H:
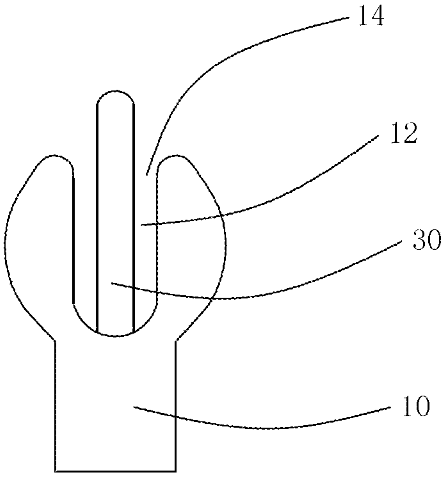
FIG. 5*h* shows an eighth embodiment of the moving space.

Further, the moving space 12 may be open in the circumferential direction. That is, the inner surface of the shell 10 surrounding the moving space 12 is discontinuous along the circumferential direction. As shown in FIGS. 5*g* and 5*h*, a circumferential opening 14 is defined in the shell 10 and communicates with the moving space 12. The circumferential opening 14 is aligned with the massage head 32 along the longitudinal direction of the massage member 30, and the massage head 32 extends out of the moving space 12 through the circumferential opening 14. In this case, not only the top and/or bottom sides, but also the massage head 32 of the massage member 30 are capable of hitting corresponding parts of the human body, which means that the area being massaged at the same time is further increased.

Figure 5I:
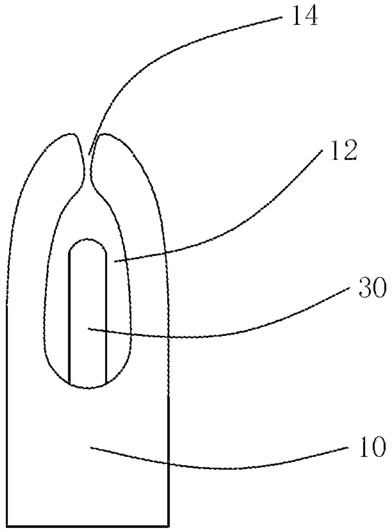
FIG. 5*i* shows a ninth embodiment of the moving space.
Figure 5J:
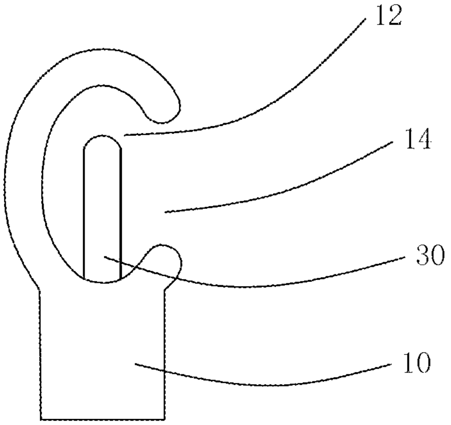
FIG. 5*j* shows a tenth embodiment of the moving space.

Alternately, the entire massage member 30 may be accommodated in the moving space 12 even the moving space 12 is open circumferentially. FIG. 5*i* shows that the moving space 12 is generally briolette and open circumferentially, whilst the entire massage member 30 is in the moving space 12. In addition, the massage member 30 accommodated in the moving space 12 may be deviated from the circumferential opening 14. FIG. 5*i* shows that the moving space 12 is generally C-shaped, and the massage member 30 is generally column-shaped and arranged parallel to the circumferential opening 14 of the moving space 12.

Figure 6A:
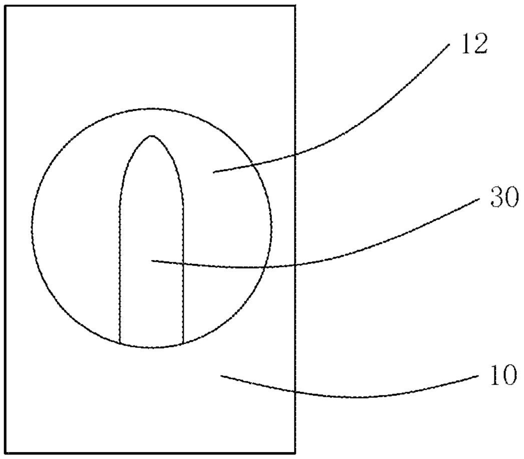
FIG. 6*a* shows a second embodiment of a massage member of the massage device.
Figure 6B:
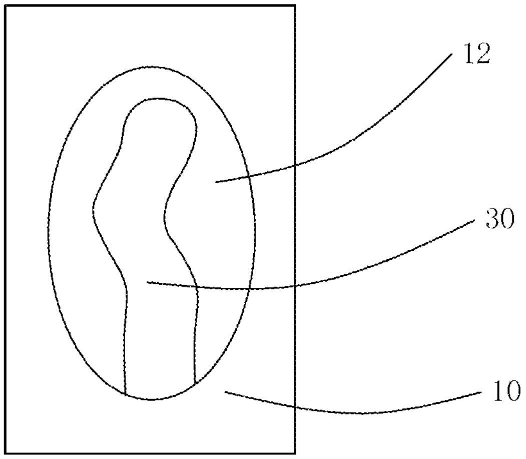
FIG. 6*b* shows a third embodiment of the massage member.
Figure 6C:
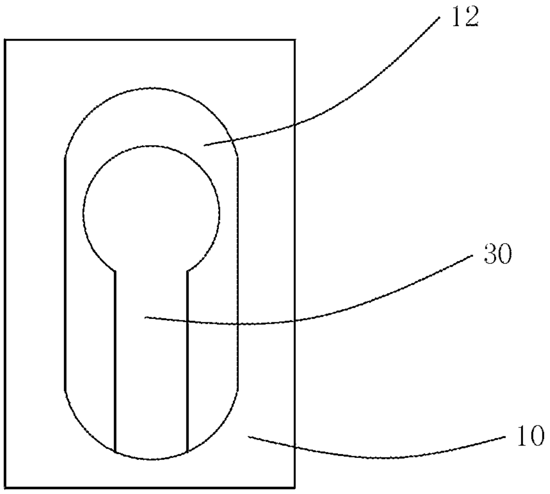
FIG. 6*c* shows a fourth embodiment of the massage member.
Figure 6D:
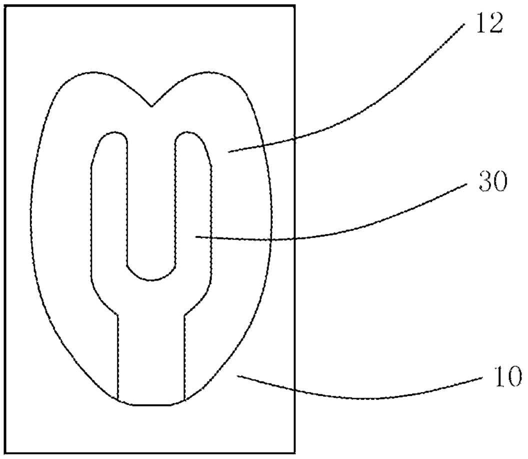
FIG. 6*d* shows a fifth embodiment of the massage member.

The shape of the massage member 30 may be regular or irregular, specifically may be any one of circle, semicircle, ellipse, square, rectangle, triangle, polygon, D-shape, C-shaped, kidney-shaped, heart-shaped, gourd-shaped, branch-shaped, and etc., or may be a combination of at least two of them. For example, the massage member 30 shown in FIG. 6*a* is generally column-shaped with the massage head thereof being rounded, the massage member 30 shown in FIG. 6*b* is generally irregular, the massage member 30 shown in FIG. 6*c* is generally a combination of a column and a circle, and the massage member 30 shown in FIG. 6*d* is generally branch-shaped. It should be understood that the shape of the massage member 30 may be set according to needs, which is not limited to the embodiments.

The shape of the massage member 30 and the shape of the moving space 12 can be selected arbitrarily, as long as the massage member 30 is movable in the moving space 12. FIGS. 5*a*-5*j* show the moving spaces 12 of different shapes with the same massage member 30, FIGS. 6*a*-6*d* show the moving spaces 12 of different shapes with the massage member 30 of different shapes. It should be noted that the present invention does not impose any restrictions on the shapes of the moving space 12 and massage member 30, and does not impose any restrictions on the combination of the shapes of the moving space 12 and massage member 30.

Referring to FIG. 1 again, the shell 10 is elongated and the moving space 12 is defined in a middle portion of the shell 10 along the longitudinal direction. Preferably, the moving space 12 in the middle portion of the shell 10 is closed circumferentially, and the shell 10 forms two supporting arms 16 at two opposite lateral sides (i.e., left and right sides) of the moving space 12. The supporting arms 16 enhance the strength of the shell 10 and thus can provide effective support for the massage member 30 even it swings rapidly and/or greatly. Preferably, the width of the supporting arm 16 ranges from 1 mm to 150 mm, which is conducive to the miniaturization of the massage device, particularly miniaturization of the diameter of the massage device, so that the massage device can be used for massage of narrow and small parts, such as the cavity of the human body.

In some embodiments, as shown in FIGS. 6*a*-6*d*, the moving space 12 may be defined at an end portion of the shell 10. In this case, the moving space 12 may be closed in the circumferential direction or be open in the circumferential direction.

The shell 10 may be designed to have an outer profile according to its application scenarios. When the massage device is used in the human body, the shell 10 may be shaped as the cavity of the human body, for example shaped as the vagina, as shown in FIGS. 1-4. When the massage device is used out of the human body, the shell 10 may be any shape, such as column-shaped, block-shaped, disc-shaped, branch-shaped, and etc.

In some embodiments, the shell 10 may be provided with a handle for holding, thereby facilitating the users to place the massage device onto any part of the human body. Alternately, the shell 10 may be provided with a wearable member, such as a telescopic belt, a bandage with a buckle, and the like. The whole massage device can be worn to the neck, the waist, the arm, the leg, and etc. through the wearable member, thereby freeing hands of the users.

Figure 2:
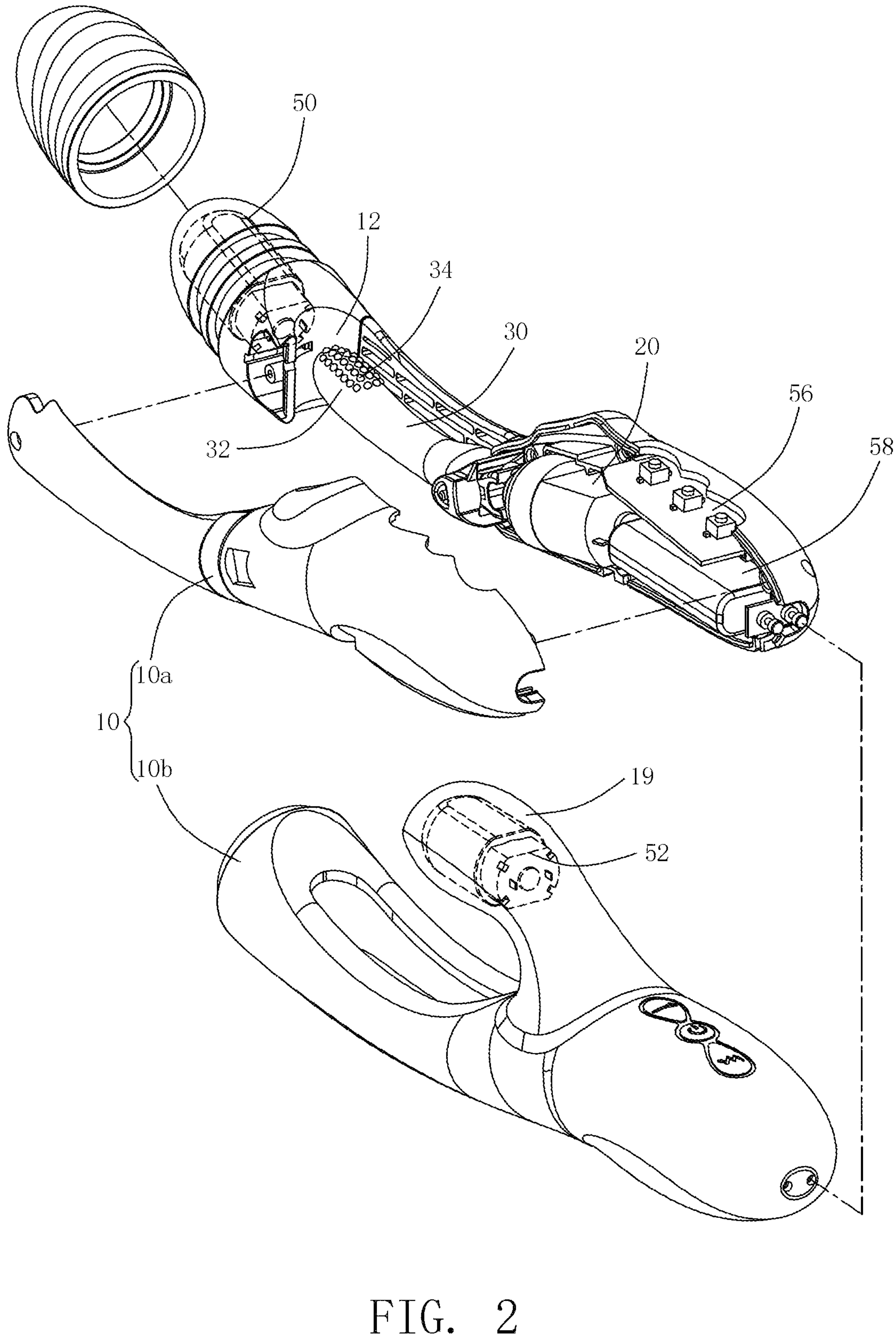
FIG. 2 is an isometric, exploded view of the massage device of FIG. 1.

As shown in FIG. 2, in this embodiment, the shell 10 is a double-layer structure, and includes an inner shell 10*a* and an outer shell 10*b* covering the whole inner shell 10*a*. The inner shell 10*a* is made of hard materials, such as plastic, metal, wood, and etc. The outer shell 10*b* is made of soft materials, such as silicone, rubber, and etc. The inner shell 10*a* inside the outer shell 10*b* not only provides support for the outer shell 10*b*, but also provides a receiving space for mounting the driving member 20. The outer shell 10*b*, which is used to touch the massaged part directly, preferably has a smooth outer surface, thereby the massage device in whole has high strength and comfortable use experience.

In this embodiment, the inner shell 10*a* is formed by injection molding as two pieces and then assembly together by snap-fitting, screws, and etc., which facilitates assembly of the elements inside the shell 10, such as the driving member 20. The outer shell 10*b* is formed by 2nd injection molding as one piece and covering the inner shell 10*a* after the inner shell 10*a* and the elements inside the inner shell 10*a* are assembled together. The integral outer shell 10*b* is beneficial to the waterproof and dustproof of the present message device, so that the message device can be used underwater or in the cavity of the human body.

In other embodiments, the inner shell 10*a* may be molded as one piece. In this case, elements mounted inside the inner shell 10*a* are arranged in the mold and then injects the inner shell 10*a*. Alternately, the outer shell 10*b* may be molded as two or more pieces and then assembled together. In this case, the shell 10 is detachable for replacing elements therein, which is good for maintenance of the massage device. The inner shell 10*a* may be the same as the outer shell 10*b*, and thus the shell 10 has two different layers in any positions. Alternately, the inner shell 10*a* may be different from the outer shell 10*b* in local areas, and thus the local areas of the shell 10 may be one layer, i.e., without the layer of the hard inner shell 10*a*.

Preferably, the moving space 12 is defined at a position of the hard outer shell 10*b* with the soft inner shell 10*a* formed therein, thus the solid portion surrounding the moving space 12 is constructed of two layers and the strength thereof is high enough to support the swinging of the massage member 30. It should be understood that: in some cases where the requirements for the use environment are not high, the moving space 12 may be formed at a position of the outer shell 10*b* without the inner shell 10*a* formed therein.

In other embodiments, the shell 10 may be a single-layer structure with certain hardness.

Referring to FIGS. 2 and 4, the massage device further includes a vibration motor 50. The vibration motor 50 is arranged in a front end of the shell 10 for generating high-frequency vibration. When the massage device is used, for example, in the vaginal of the human body, the vibration motor 50 in the front end of the shell 10 generates vibration effect to the vaginal wall, and the massage member 30 generates scratch effect to the vaginal wall at the same time, which can multiply the stimulation effect to the users.

Preferably, the massage device includes two vibration motors 50, 52, one of which is arranged in the front end of the shell 10, and the other is arranged in a branch 19 of the shell 10 which extends curvedly from a rear end of the moving space 12 of the shell 10 to an upper side of the massage member 30. When the massage device is used in the vagina, the vibration motor 50 in the front end of the shell 10 generates vibration effect to the vaginal wall, the massage member 30 generates scratch effect to the vaginal wall, and the vibration motor 52 in the branch 19 of the shell 10 generates vibration effect to the clitoris, which can maximize the stimulation effect to the users.

Figure 8:
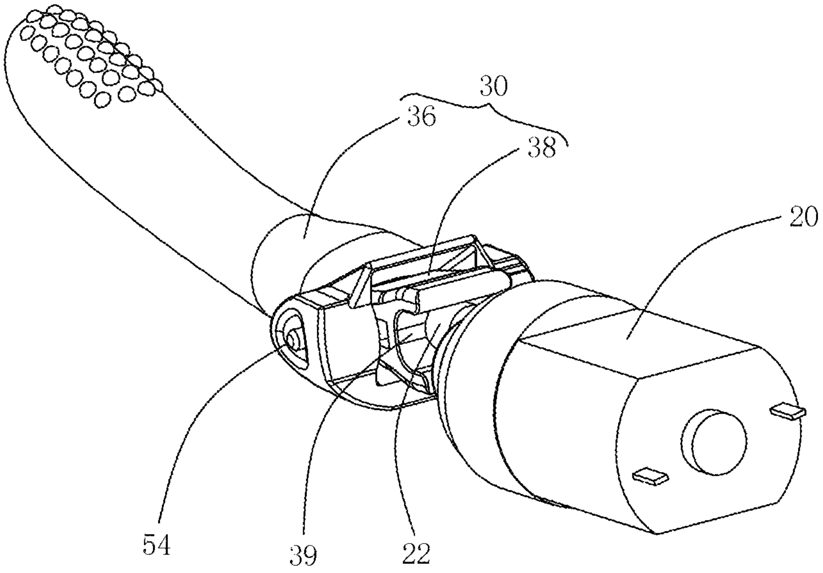
FIG. 8 is an isometric, assembled view of a massage module of the massage device of FIG. 1.
Figure 8A:
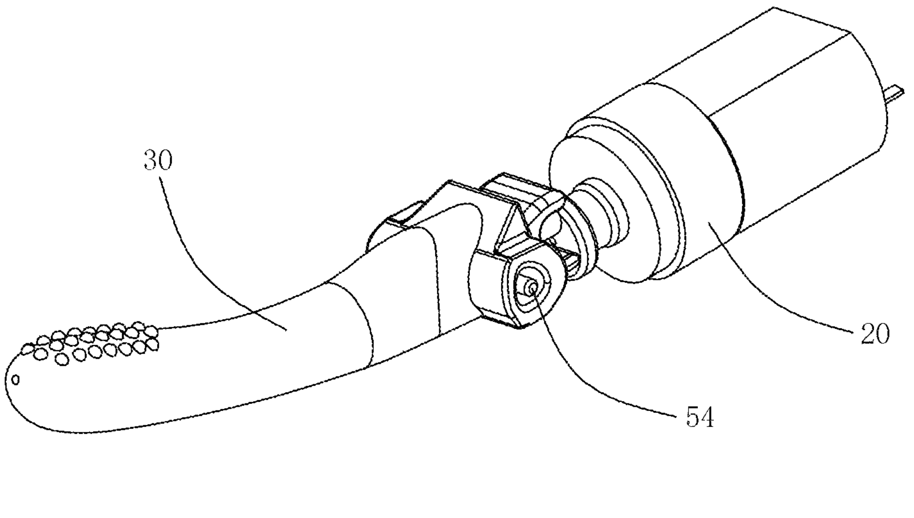
FIG. 8*a* shows the massage module of FIG. 8 from another aspect.
Figure 8B:
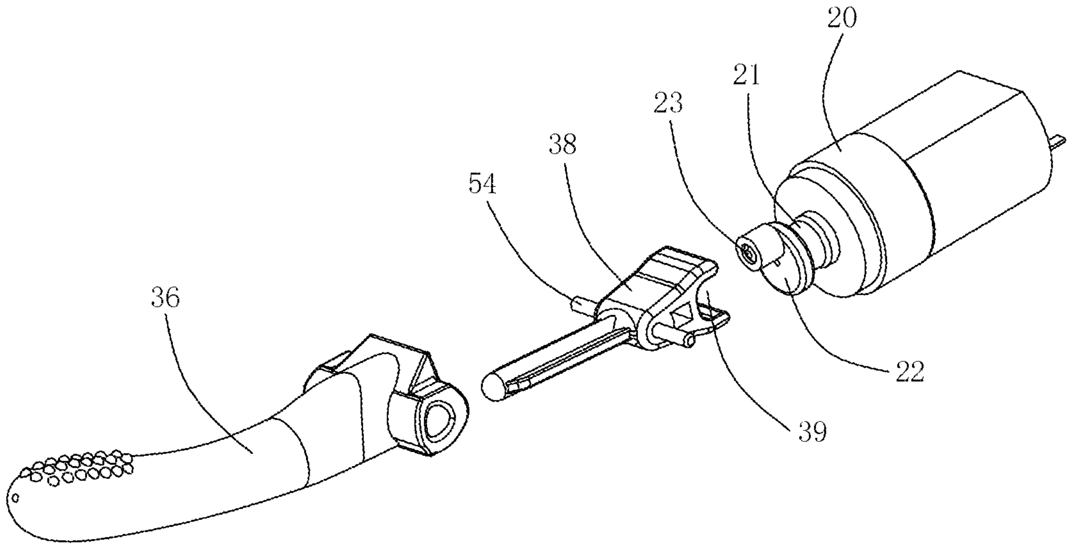
FIG. 8*b* is an exploded view of the massage module of FIG. 8*a*.

Referring to FIGS. 8*a*-8*c*, the driving member 20 is used to generate power to make the massage member 30 move relative to the shell 10, and can be motor, cylinder and the like. Preferably, the driving member 20 is a rotary motor or a linear motor. Preferably, a transmission member 22 is arranged between the driving member 20 and the massage member 30. The transmission member 22 may be gear mechanism, pulley mechanism, crank mechanism, cam mechanism, turbine mechanism, and etc., which not only transmits power from the driving member 20 to the massage member 30, but also change the movement mode therebetween, such as change the rotation of the driving member 20 to the swinging of the massage member 30.

In this embodiment, the driving member 20 is a rotary motor, and the transmission member 22 is a cam. The rotary motor 20, the cam 22 and the massage member 30 cooperatively construct a massage module. The rotary shaft 21 of the rotary motor 20 is connected to a central portion of the cam 22, and a driving shaft 23 extends out from a periphery of the cam 22 to connect the massage member 30. Both the rotary shaft 21 and driving shaft 23 extend generally parallel to the longitudinal direction of the shell 10, but the driving shaft 23 is eccentric with respect to the rotary shaft 21. During rotation of the driving shaft 23, the driving shaft 23 revolves around the rotary shaft 21 to generate movement along both the thickness direction and the width direction of the shell 10.

In other embodiments, the driving member 20 may be a linear motor, which has an output shaft rotationally connected to the massage member 30. During the reciprocating motion of the linear motor, it drives the massage member 30 to swing up and down. In this case, the massaged parts are massaged in the form of slapping. Alternately, the driving member 20 may be a vibration motor, which directly transmits vibration to the massage member 30.

In other embodiments, the driving member 20 and the massage member 30 may be connected in a transmission way but in a manner of non-contact. For example, the driving member 20 may be in the form of an electromagnet, and the massage member 30 is connected to the driving member 20 by magnetic force. The polarity of the electromagnet is changed according to the current directions applied to driving member 20, making the magnetic force between the driving member 20 and the massage member 30 attract or repel each other, thus realizing the swing action of the massage member 30.

In this embodiment, the massage member 30 includes a soft cover 36 and a hard core 38 embedded in the soft cover 36. The hard core 38 defines a groove 39 at an end thereof adjacent to the driving member 20 for receiving the driving shaft 23, and the groove 39 is configured that movement of the driving shaft 23 along the thickness direction is limited, while movement of the driving shaft 23 along the width direction is allowed. For example, a size of the groove 39 in the width direction is much larger than the diameter of the driving shaft 23, and a size of the groove 39 in the thickness direction is equal to or slightly larger than the diameter of the driving shaft 23. In this way, the driving shaft 23 is capable of driving the hard core 38 to move upwardly and downwardly, in turn driving the massage member 30 to swing along the thickness direction to the outside environment.

Two opposite lateral sides of the hard core 38 are rotatably connected to the shell 10, preferably to the inner shell 10*a* by a pivot 54. The pivot 54 is arranged adjacent to the groove 39, thereby the massage head 32 of the massage member 30 has a greater swing amplitude. Preferably, the hard core 38 has a length not less than a half of the soft cover 36. That is, the hard core 38 at least extends to a middle portion of the soft cover 36, providing sufficient support for the soft cover 36 and being conducive to driving the massage head 32 of the soft cover 36 to swing.

Figure 9A:
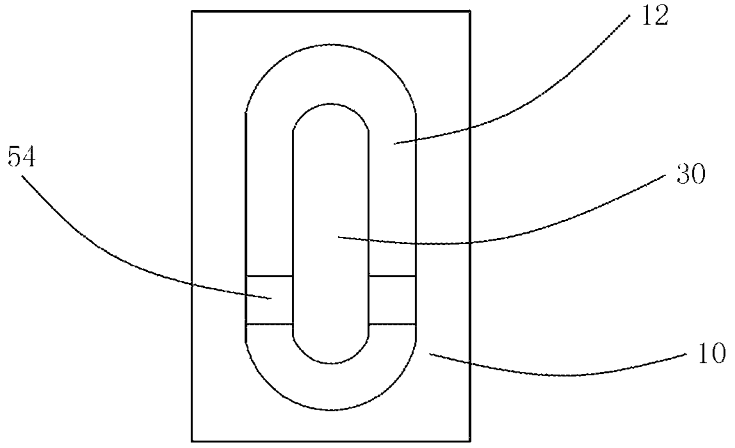
FIG. 9*a* shows a second embodiment of the massage module.
Figure 9B:
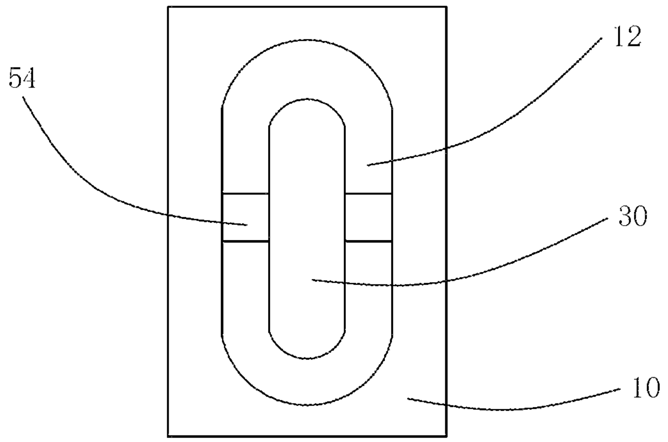
FIG. 9*b* shows a third embodiment of the massage module.
Figure 9C:
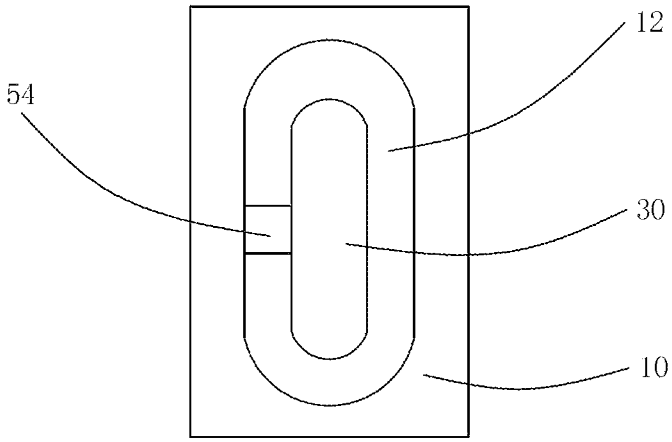
FIG. 9*c* shows a fourth embodiment of the massage module.
Figure 9D:
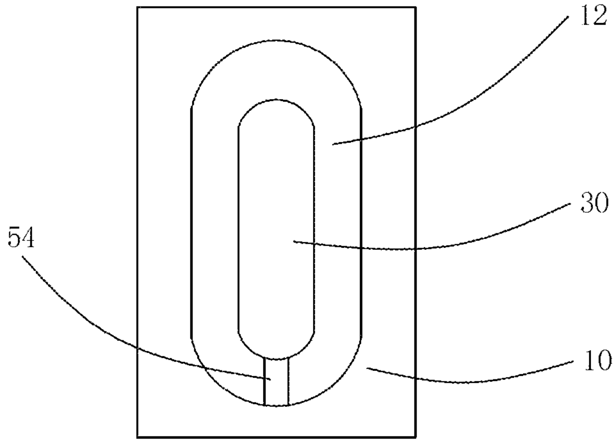
FIG. 9*d* shows a fifth embodiment of the massage module.

The massage member 30 connected to the shell 10 at a position adjacent to an end thereof connected to the driving member 20 makes the massage member 30 as a simple pendulum, so that the massage head 32 at the other end of the massage member 30 away from the driving member 20 have a greater swing amplitude. In other embodiments, the massage member 30 may be connected to the shell 10 at a middle portion thereof, as shown in FIG. 9*b*. In addition, the massage member 30 may be connected to the shell 10 at one side, such as the left side shown in FIG. 9*c*. Further, as shown in FIG. 9*d*, the massage member 30 may be connected to the shell 10 at a distal end thereof.

Referring to FIGS. 2 and 4 again, the massage device further has a control member 56, such as a control circuit board mounted in the shell 10. The control member 56 is electrically connected to the rotary motor 20 and the vibration motors 50, 52 for controlling their operation according to the user's instructions, such as controlling the frequency of the vibration motors 50, 52, controlling the rotary speed of the rotary motor 20, and etc.

Preferably, a battery 58 is arranged in the shell 10 and connected to the circuit board 56 electrically. The battery 58 supplies electric power to the motors 20, 50, 52 through the circuit board 56. Preferably, the battery 58 is a rechargeable battery, and a corresponding charging interface 59 may be provided at a rear end of the shell 10 to connect external power supply to charge the battery 58.

The massage device according to the embodiment of this invention defines the moving space 12 in the shell 10 for providing sufficient space for the swinging of the massage member 30, so that the massage device 30 is capable of generating strong force to the massaged part even under the resistance of the massaged part, thereby playing good massage effect. Further, the present massage device is provided with vibration motors 50, 52 for generating high high-frequency vibration, further improving the massage effect.

Finally, it should be noted that: the above merely describes preferred embodiments of the present invention without intention to limit the scope of the present invention. Although the present invention has been described in detail with reference to the foregoing embodiments, for those skilled in the art, the technical solutions described in the foregoing embodiments can still be modified, or some of the technical features can be equally replaced. Any modifications, equivalent replacements, improvements, and etc. made within the spirit and principle of the present invention should be within the scope of the present invention.

What is claimed is:

1. A massage device, comprising:

a shell configured to be inserted into a vagina along an insertion direction, a lateral wall of the shell concaved inwardly and laterally relative to an outer lateral surface of the shell to define a moving space, the moving space communicating with an outside environment out of the outer lateral surface of the shell, wherein the lateral wall extends along the insertion direction of the shell;

a driving member arranged in a chamber of the shell, wherein the chamber is adjacent to and not communicating with the moving space, the driving member configured to drive an eccentric driving shaft, the shell comprising a first inner surface that formed an opening, the opening is positioned between the moving space and the chamber; and a massage member connected to the driving member in a transmission way, the massage member being swingable in a lateral direction of the shell under the driving of the driving member, wherein when the massage member swings, a first end portion of the massage member is reciprocating to at least a first position inside the moving space of the shell and at least a second position in the outside environment out of the outer lateral surface of the shell, wherein the massage member comprises an elongated soft cover and an elongated hard core, the elongated soft cover is curved upward along a length of the elongated soft cover, the elongated soft cover comprises an upward facing concave curved surface extending along the length of the elongated soft cover, the elongated soft cover comprises the first end portion and a second end portion that is opposite from the first end portion, the second end portion of the elongated soft cover is configured to receive a first end portion of the elongated hard core, the elongated hard core defines a groove at a second end portion of the elongated hard core, the groove is configured to receive the eccentric driving shaft, and wherein the second end portion of the elongated soft cover extends from the moving space through the opening and into the chamber and the second end portion of the elongated soft cover is configured to abut the first inner surface that formed the opening.

2. The massage device according to claim 1, further comprising a stimulation member arranged in a second chamber of the shell which is not communicating with the moving space, wherein the chamber and the second chamber are defined by a second inner surface of the shell that is interior to the outer lateral surface of the shell.

3. The massage device according to claim 2, wherein the stimulation member is a vibration motor.

4. The massage device according to claim 2, wherein the second chamber is defined at an end of the shell which is configured to be inserted into the vagina during in use.

5. The massage device according to claim 4, wherein the moving space is located between the stimulation member and the driving member along the insertion direction of the shell.

6. The massage device according to claim 2, wherein the second chamber is defined in a branch of the shell, wherein the branch extends curvedly from a rear end of the moving space of the shell to an upper side of the shell, the branch is configured to be located outside of the vagina and the stimulation member arranged in the second chamber is configured to generate vibration effect to a clitoris during use.

7. The massage device according to claim 1, wherein the moving space extends through the outer lateral wall along a swing direction of the massage member, the massage member is substantially perpendicular to the insertion direction of the shell, and two openings are defined in two opposite sides of the outer lateral surface of the shell, respectively, and wherein when the massage member swings, the portion of the massage member reciprocates in three different positions, the three different positions comprise the first position inside the moving space of the shell, the second position in the outside environment out of the outer lateral surface of the shell via a first opening of the two openings, and a third position out of the outer lateral surface of the shell via a second opening of the two openings.

8. The massage device according to claim 1, wherein a thickness of the massage member in the lateral direction of the shell is less than a depth of the moving space in the lateral direction of the shell.

9. The massage device according to claim 8, wherein a shape of the massage member is different from that of the moving space, and a gap is defined between an outer surface of the massage member and a surface of the shell surrounding the moving space, wherein a width of the gap changes along a circumferential direction.

10. The massage device according to claim 1, wherein the moving space is defined at a middle portion of the shell and is closed along a circumferential direction.

11. The massage device according to claim 1, wherein a plurality of bulges are formed on an outer surface of the massage member.

12. The massage device according to claim 1, wherein the driving member comprises a rotary motor, and a cam comprising the eccentric shaft, the cam is connected between the rotary motor and the massage member, the hard core is rotatably connected to the shell, and the cam is movably connected to the hard core.

13. The massage device according to claim 12, wherein the groove is configured such that movement of the eccentric driving shaft along a swinging direction of the massage member is limited, and movement of the eccentric driving shaft along a direction perpendicular to the swinging direction of the massage member is allowed.

* * * * *